United States Patent [19] [11] 3,688,665
Herden [45] Sept. 5, 1972

[54] CAMERA IN GUN FORM
[72] Inventor: Robert B. Herden, 428 Woodland Lane, Webster, N.Y. 14580
[22] Filed: Nov. 20, 1970
[21] Appl. No.: 91,304

[52] U.S. Cl. ............................95/12, 95/86, 352/95
[51] Int. Cl. .............................................G03b 79/00
[58] Field of Search ........95/11, 12, 12.5, 86; 352/95

[56] References Cited

UNITED STATES PATENTS

| 3,545,356 | 12/1970 | Nielson | 95/12 |
| 2,854,901 | 10/1958 | Fathauer | 95/12 |
| 3,106,129 | 10/1963 | Frenk et al. | 95/12 |
| 2,622,497 | 12/1952 | Cornut | 95/42 |
| 3,545,355 | 12/1970 | Cahall | 95/12 |
| 3,546,378 | 11/1967 | Karikawa | 95/12 |
| 3,182,576 | 5/1965 | Papke | 95/42 |
| 3,563,146 | 2/1971 | Miller | 95/12.5 |
| 791,800 | 6/1905 | Laur | 95/12 |
| 2,416,769 | 3/1947 | Palmer | 95/12 |
| 2,414,083 | 1/1947 | Borden | 95/86 |

Primary Examiner—John M. Horan
Assistant Examiner—Alan A. Mathews
Attorney—Shlesinger, Fitzsimmons & Shlesinger

[57] ABSTRACT

An in-line telescopic objective and viewer with a laterally offset film holder and shutter are built as a gun camera. A trigger-operated mirror between the objective and field lenses of the viewer is pivotal between an inoperative position, where it caps the film aperture out of the line of sight in the viewer, and an operative position where it is inclined transversely across the line of sight to reflect light from the objective lens down onto a second, inclined mirror, which reflects this light laterally to the film aperture. A focal plane shutter, which reciprocates across this aperture is movable manually by a cocking bar to a cocked position, where it is releasably held by the trigger until the first-named mirror has been swung to its operative position. A beam splitter may be used in place of the pivotal mirror, in which case a reciprocable, trigger-operated capping plate is used to prevent film exposure during recocking.

18 Claims, 8 Drawing Figures

CAMERA IN GUN FORM

This invention relates to an integrated camera-gun, having a telescopic objective for long range photography.

Heretofore various gun-type cameras, have been devised for photographing objects from a distance. Typically such prior devices have comprised the basic combination of a gunstock, a camera mounted on the gunstock, and a trigger for operating the camera's shutter releasing mechanism. In certain cases a telescopic sight has also been included to assist in long range photography of an object.

Most such prior gunstock mounted cameras, however, have been relatively crude, difficult to load with film, extremely bulky and thus inconvenient to handle, and vulnerable to damage in environment for which the camera is not suited. Moreover, typically where such a prior device has incorporated an eyepiece in its sighting mechanism, the eyepiece has been offset from the objective lens, thus introducing parallax of either the optical or pointing variety in the sighting system. Further disadvantages include inverted viewing images and improper image restitution at the film plane on some versions.

It is an object of this invention to provide an improved photogun comprising an integrated camera-gun device which is substantially more compact, and sturdy than prior such devices, and which has a film holder placed at the side of frame for easier loading and easier handling in the field.

A further object of this invention is to provide a photogun of the type described having an improved telescopic viewing mechanism, which provides an in-line sight, so that the operator can observe the exact image that will be photographed.

Another object of this invention is to provide an improved photogun which is capable of shooting either motion or still pictures at long range, without change in basic configuration.

A still further object of this invention is to provide an improved photogun that has a novel trigger interlock mechanism, which prevents accidental damage to the photogun, and also avoids film spoilage.

Another object of this invention is to provide a novel photogun having a shutter mechanism entirely separate from the objective lens in order to make possible a selection of shutterless lenses when used with drop in film cartridges.

Still another object of this invention is to provide a photogun having an in-line telescopic sighting mechanism which achieves parfocalization of the photographic and visual image planes in the gun in a manner which avoids pointing parallax.

Other objects of the invention will be apparent hereinafter from the specification and from the recital of the appended claims, particularly when read in conjunction with the accompanying drawings.

Referring now to the drawings by numerals of reference, and first to the embodiment illustrated in FIGS. 1 to 7, 20 denotes a photogun comprising a hollow, metal frame 21 having a generally rectangular central section 22, a rectangular rear section 23, which is smaller than and offset beneath the central section 22, and a cylindrical barrel section 24 which projects forwardly from section 22. Fastened at its forward end in any conventional manner to the rear end of frame section 23 is a conventional gun stock 26.

Slidably mounted at its rear end coaxially in the bore of barrel section 24 is a metal sleeve 30, in the forward end of which is threaded a conventional lens housing 32 containing the usual objective lens 34. Rotatably mounted beneath and parallel to the barrel section 24 is an externally knurled focusing sleeve 36, the forward end of which is journaled in a stop lug 38 that is secured to and projects beneath barrel section 24 adjacent its forward end. At its rear end sleeve 36 has a reduced-diameter portion 37 which is rotatably journaled in a mounting plate 40 that is fastened to the forward end of frame section 22 beneath and transverse to section 24.

Mounted for axial sliding movement in the bore of the sleeve 36 is a focusing shaft 42, the forward end of which projects slidably through a bore in the stop 38, and which is fastened in a registering bore in a lug 44 that is secured to, and projects downwardly from, the forward end of the lens housing 32, so that any axial movement of the shaft 42 will be transmitted to sleeve 30, and hence to the lens 34 in housing 32. The rear end of shaft 42 has an externally threaded portion 46 (FIG. 2), which cooperates with threads formed in the bore of the reduced-diameter portion 37 of the sleeve 36, so that when the latter is rotated, the shaft 42 will be shifted correspondingly in the bore of sleeve 36.

Mounted for axial sliding movement on the rear end of sleeve 36 between plate 40 and an external shoulder 48 (FIG. 2), which is formed on the sleeve intermediate its ends, is an externally knurled cocking ring or collar 50. Secured at its forward end in a recess 51 (FIG. 4) formed in the outer periphery of ring 50, and extending rearwardly into the frame section 22 in radially offset, parallel relation to the rear end of sleeve 36, is an elongate cocking rod 52 (FIGS. 2 to 6). The rear end of rod 52 is supported for axial sliding movement in a bore formed in the downwardly projecting tang or skirt portion 53 of a bracket 54 (FIGS. 2 and 3), which is fastened by screws 55 in frame section 23 adjacent its rear end. A coiled compression spring 56 (FIG. 2), which surrounds the rear end of rod 52, is seated at one end against the stationary tang 53, and at its opposite end against a C ring or washer 57, which is secured to rod 52 intermediate its ends. Spring 56 thus normally urges the cocking rod 52 into its forward or released position, in which the cocking ring 50 is seated against the shoulder 48 on sleeve 36 as shown in FIGS. 1 and 2.

Figure 1:
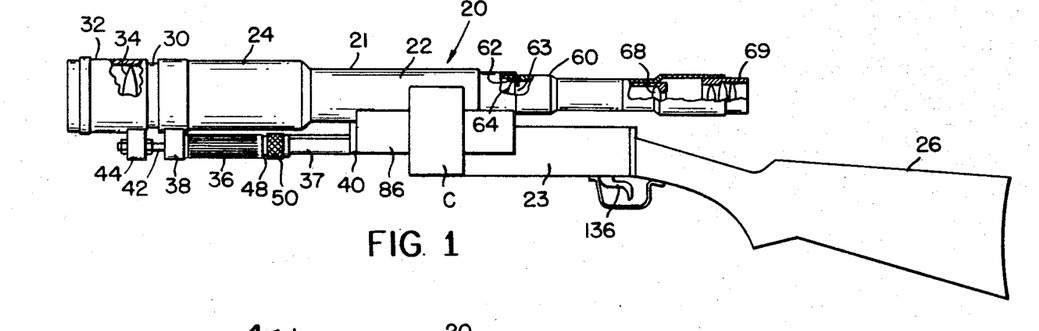
FIG. 1 is a side elevational view of a photogun made in accordance with one embodiment of the invention, portions of the photogun being cut away and shown in section.
Figure 2:
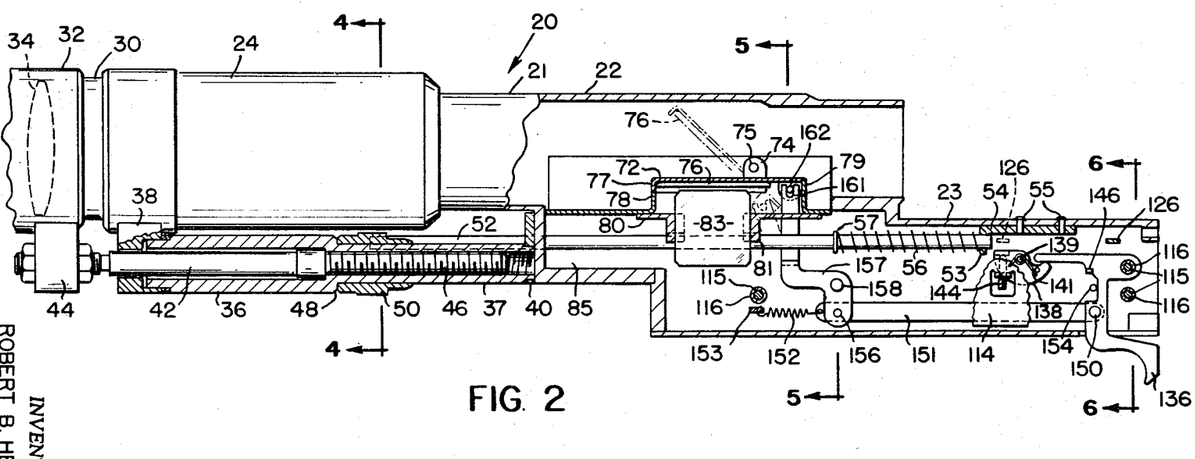
FIG. 2 is an enlarged, fragmentary side elevational view of this photogun similar to FIG. 1, but with further portions thereof cut away for purposes of illustration.

Removably secured at its forward end in the rear end of frame section 22 coaxially of section 24 is an elongate tube 60 (FIG. 1). Secured in the forward end of tube 60 is an annular mask 62, which has a reduced-diameter opening 63 in its rear end. Mounted coaxially in the mask 62 forwardly of the opening 63 is a field lens 64, having a convex forward face registering with the objective lens 34 axially thereof, and a plane, flat rear face ground finely in an annular configuration to form an image producing surface on which the image projected by the objective lens 34 will be displayed visably in an inverted position.

Secured in tube 60 adjacent its rear end is an erector lens 68 (FIG. 1), which registers axially with the field lens 64 to right the image displayed on the rear surface thereof. Mounted on tube 60 rearwardly of the erector lens 68 is a cylindrical lens case 69, containing a conventional magnifying eye piece lens for focusing the righted or upright image developed by the lens 68.

Figures 3, 4, 5:
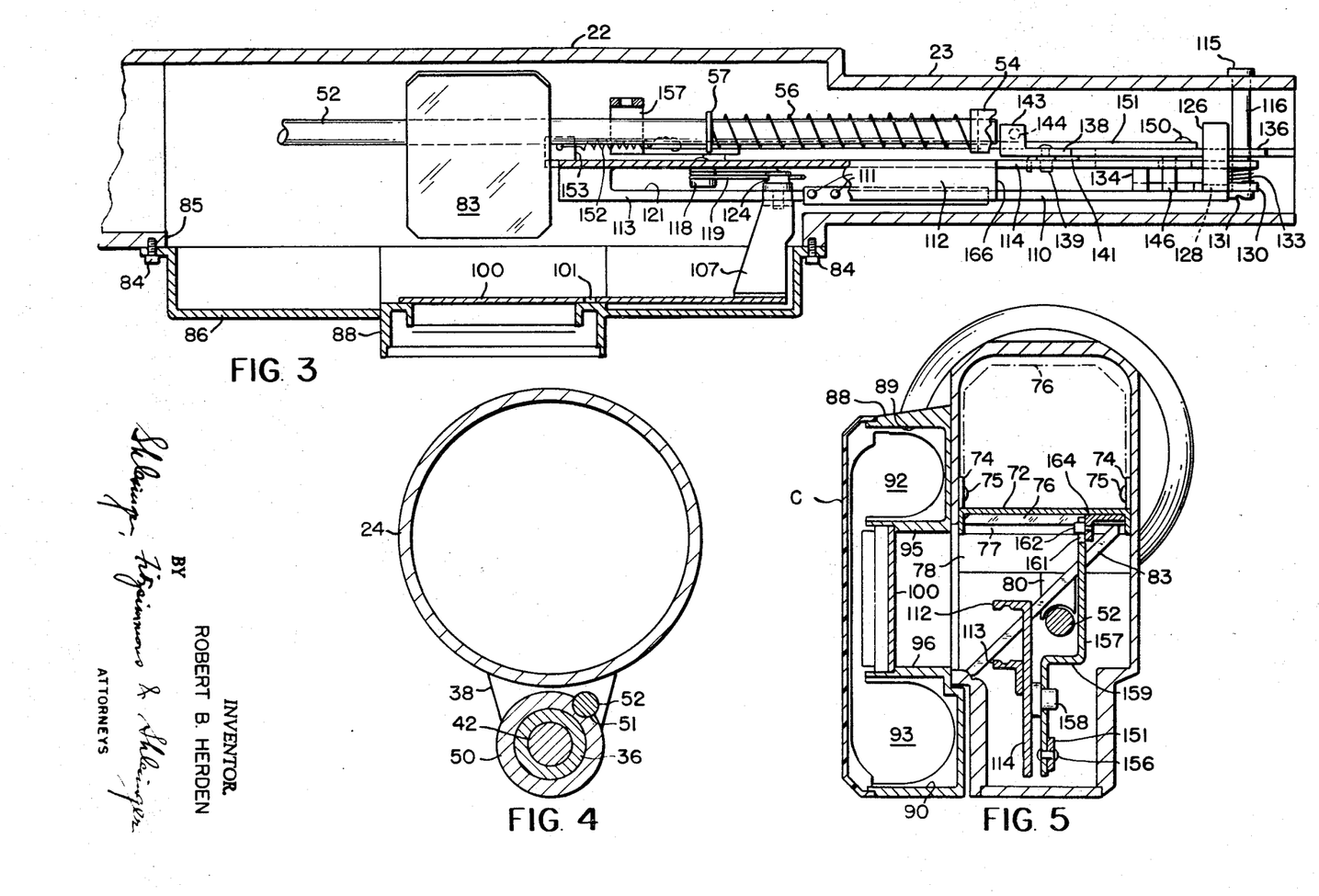
FIG. 3 is an enlarged fragmentary plan view of this photogun, portions thereof again being broken away and shown in section.
FIG. 4 is an enlarged sectional view taken along the line 4—4 in FIG. 2 looking in the direction of the arrows.
FIG. 5 is an enlarged sectional view taken along the line 5—5 in FIG. 2 looking in the direction of the arrows, and with portions of the film housing cut away.

Mounted in the central frame section 22 adjacent the upper end thereof to pivot about a horizontal axis forwardly of the field lens 64 is a rectangular, mirror mounting plate 72 (FIGS. 2 and 5). Projecting from the upper surface of plate 72 adjacent opposite sides thereof are a pair of spaced, parallel tangs 74, which are pivotally connected by screws or rivets 75 to opposite sides of section 22 for pivotal movement about a common axis disposed beneath and transverse to the axis of lenses 34 and 64. Fastened to the underside of plate 72 is a large, rectangular mirror 76, which is pivotable with the plate 72 between a lower or inoperative position as illustrated by solid lines in FIGS. 2 and 5, and an upper or operative position (broken lines in FIGS. 2 and 5) in which it is inclined transversely across the space in the frame section 22 with its reflective surface facing forwardly in the direction of the objective lens 34. Plate 72 and mirror 76 are slightly narrower than the space between the sidewalls of section 22 so that the frame does not interfere with their pivotal movements.

The forward and side edges of plate 72 are bent slightly downwardly to form thereon a skirt portion 77 (FIGS. 2 and 5) the forward edge of which, when the plate 72 is in its inoperative or lowered position, seats against the upper edge of a transverse rib 78, which extends between the sidewalls of frame section 22 beneath the axis of lens 34 and 64. Also when plate 72 is in its lowered or inoperative position, its trailing edge is disposed in closely spaced, confronting relation to a further rib 79 (FIG. 2), which extends transversely between the sidewalls of the frame section 22 rearwardly of the rib 78, and in spaced, parallel relation thereto. Thus, when the plate 72 and mirror 76 are in their lowered, inoperative positions, opposite sidewalls of the frame section 22 and the transverse ribs 78 and 79 cooperate with the lowered plate 72 to prevent any light, which is admitted to the interior of frame section 22 through the objective lens 34, from passing downwardly in section 22 beneath the lowered plate 72.

Mounted beneath and in registry with mirror 76 by a pair of angle brackets 80 and 81 (FIG. 2), which are fastened to the undersides of ribs 78 and 79, respectively, is a second mirror 83. Opposite side edges of mirror 83 are secured in inclined slots formed in the confronting faces of the brackets 80 and 81, so that mirror 83 is fixed in a plane extending approximately 45° to the vertical, and to the opposed sidewalls of the frame section 22. The upper, reflective face of the mirror 83 registers laterally with part of an elongate opening 85 (FIGS. 2, 3 and 5) formed in one side (the left side in FIG. 5) of the frame section 22.

Secured by screws 84 (FIG. 3) to the outside of section 22 over opening 85 is an elongate housing 86 (FIGS 1 and 3). Intermediate its ends housing 86 has a vertically extending central section 88 (FIG. 5) containing a pair of vertically spaced, parallel recesses or sockets 89 and 90 (FIG. 5) for releasably housing the film spool chambers 92 and 93 of a film holder C, which may be of the instamatic variety. The inner sides of recesses 89 and 90 are bounded by a pair of spaced, parallel ribs or partitions 95 and 96, which are formed in the housing 86 to register approximately with the upper and lower edges, respectively, of the inclined mirror 83.

Figure 6:
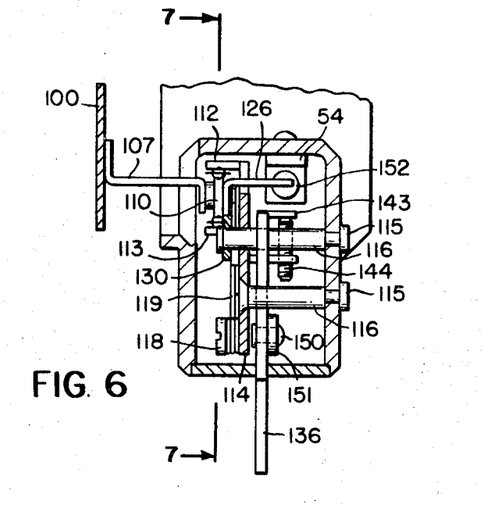
FIG. 6 is an enlarged fragmentary sectional view taken along the line 6—6 in FIG. 2 looking in the direction of the arrows.
Figure 7:
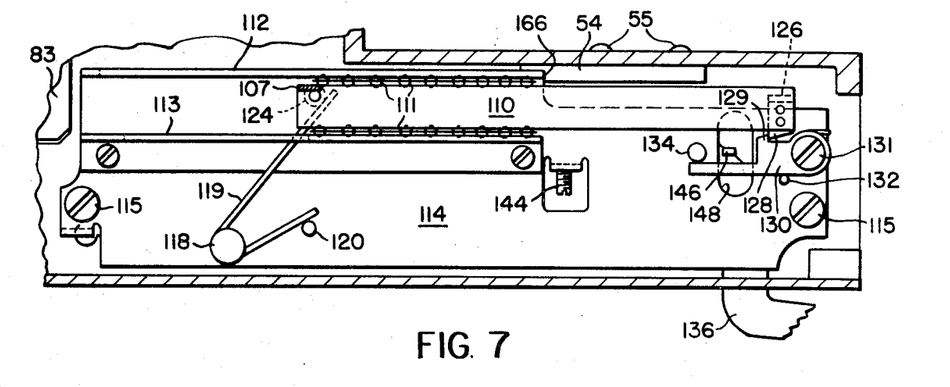
FIG. 7 is a fragmentary sectional view taken along the line 7—7 in FIG. 6 looking in the direction of the arrows.

Slidably mounted along its upper and lower edges in confronting notches or guideways formed on the insides of the ribs 95 and 96 adjacent the outer ends thereof, and reciprocable in a direction parallel to the lens axes in a manner described hereinafter, is an elongate, rectangular, focal plane shutter plate 100 (FIGS. 3, 5 and 6). Intermediate its ends plate 100 has a narrow, vertical slot 101 (FIG. 3), which is movable with plate 100 transverse to the axis of the mirror 83 and opening 85 between first and second limit positions in housing 86 adjacent opposite sides, respectively, of the central section 88 of the housing.

Adjacent its rear or right end, as illustrated in FIG. 2, shutter plate 100 is attached to one end of an arm 107 (FIGS. 3, 6 and 7), which projects through the opening 85 toward the center of frame section 22. At its inner end arm 107 is fastened to the forward end of a reciprocable shutter operating bar 110 (FIGS. 3, 6 and 7), the upper and lower edges of which roll on ball bearings 111 (FIGS. 3 and 7) to guide the bar for reciprocable movement parallel to the axis of the photogun lenses. Bar 110 and its associated ball bearings 111 are supported between a pair of vertically spaced, horizontally disposed arms 112 and 113, which project laterally from a stationary support plate 114, which is supported between opposite side walls of frame 21 by a plurality of screws 115 and spacers 116 (FIGS. 2 and 6).

Fastened intermediate its ends by a screw 118 (FIGS. 3, 6 and 7) to the outer face of plate 114 beneath the bar 110 is a coiled leaf spring 119, one end of which engages a stationary pin 120 (FIG. 7) on the plate 114, and the opposite end of which projects upwardly through registering slots 121 (FIG. 3) in the bracket supports 112 and 113, and into a groove formed in the periphery of a pin 124 (FIGS. 3 and 7), which projects from the inside of bar 110 at its forward end. Spring 119 operates to urge the bar 110 forwardly toward a released or fired position as described hereinafter.

Secured to the rear end of bar 110, and projecting at one end laterally over the upper edge of plate 114 and behind the rear end of the cocking rod 52 is a cocking lug or dog 126 (FIGS. 2, 3 and 6). The end of dog 126, which is fixed to bar 110, projects downwardly beneath the bar and has formed thereon a tooth 128 (FIGS. 3 and 7), which is releasably engageable with a cooperating tooth 129 (FIG. 7) formed on the upper edge of a pawl 130 (FIGS. 3, 6 and 7) intermediate the ends thereof. Pawl 130 is pivotally mounted at its rear end by screw 131 (FIG. 7) on one of the spacers 116 (upper in FIG. 6) which projects through plate 114 adjacent its rear edge. One end 132 (FIG. 7) of a coiled torsion spring 133 (FIG. 3) on this spacer 116 urges the pawl 130 in a clockwise direction resiliently to maintain its forward end against the underside of a stop pin 134, which projects from the support 114.

A trigger 136 is pivoted adjacent its upper end on the same spacer 116 as the pawl 130, and projects at its forward end over the rear end of a safety cam 138 (FIGS. 2 and 3), which is rotatably mounted intermediate its ends on a pin 139 that projects from plate 114 forwardly of trigger 136. A torsion spring 141 normally urges cam 138 in a direction to cause a lateral tongue 143 (FIGS. 3 and 6) on the forward end of the cam to seat against the upper end of a vertical stop pin or set screw 144, which is also mounted on plate 114. Intermediate its ends trigger 136 has an integral, laterally projecting tang 146 (FIGS. 2, 3 and 7), which projects through a registering opening 148 (FIG. 7) in the plate 114 to overlie the forward end of pawl 130 between its tooth 129 and the stop pin 134.

Adjacent its lower end the trigger 136 is pivotally connected by a pin 150 (FIGS. 2, 3 and 6) to the rear end of a link 151, which projects forwardly into the frame section 22, where it is connected by a tension spring 152 to a stationary lug 153 on the forward end of plate 114. Spring 152 causes the link 151 normally to urge the trigger 136 clockwise about its pivotal axis and into engagement with a stop pin 154 (FIG. 2), which projects from plate 114, so that the forward end of the trigger remains engaged with the rear end of cam 138.

Adjacent its forward end link 151 is pivotally connected by a pin 156 (FIGS. 2 and 5) with the lower end of a lever 157, which is pivotally mounted intermediate its ends on a pin 158 that projects from plate 114 intermediate its ends. Above the pin 158 lever 157 has a laterally offset portion 159 (FIG. 5), which passes beneath and in spaced relation to the cocking rod 52; and it has a bifurcated upper end 161, which is pivotally connected by a pin 162 to a tang or lug 164 (FIG. 5), which is fastened to and projects downwardly from the rear end of the mirror support plate 72. When the trigger 136 is pulled rearwardly, link 151 pivots lever 157 counter-clockwise (FIG. 2) about its pivot pin 158, thereby swinging pivot pin 162 forwardly and downwardly, so that plate 72 and the associated mirror 76 are caused to pivot upwardly from inoperative to operative positions. Upon release of the trigger 136, the spring 152, together with the gravitational force exerted on the plate 72 and the mirror 76 cause the mirror 76 to be swung downwardly to its lowered or inoperative position.

In use, and assuming that the shutter operating bar 110 is in its cocked or retracted position (FIG. 3) so that its tooth 128 is engaged releasably with the tooth 129 on pawl 130, the shutter plate 100 will be in its retracted or cocked position, wherein its slot 101 (FIG. 3) will be disposed adjacent the rear or right side of the central or film section 88 of the housing 86 plate, so that the slot does not register with the film aperture (not illustrated) in the camera C. At this time, therefore, the forward end of shutter plate 100 prevents exposure of the unexposed frame of film which registers laterally at this time with the reflective surface of the inclined mirror 83. Also at this time, the spring 152 (assuming that there is no pressure on the trigger 136) maintains the link 151 in its advanced position, so that the trigger is seated against the stop pin 154, and the lever 157 is in its upright position (solid lines in FIG. 2), whereby it maintains mirror 76 and plate 72 in their lowered or inoperative positions.

When plate 72 is in its lowered position, its upper surface is disposed beneath the line of sight of the operator, when the latter sights through the eye piece lenses to view the image projected by the lens 34 onto the rear surface of the field lens 64. To focus this image, the operator then rotates the focusing sleeve 36 until the image outlined by the mask opening 63 is in proper focus.

When the image is properly focused, the operator begins to squeeze the trigger 136. At this time the spring 56 has urged the cocking rod 52 to its advanced position, so that the rear end of the rod is positioned slightly forwardly of the tongue 143 on the safety cam 138, so that the cocking rod will not interfere with clockwise rotation of this cam about its axis of rotation. Also at this time the tang 146 on the trigger is spaced slightly above the forward end of the pawl 130 (see FIG. 7), so that during the initial squeezing of the trigger 136, and before the tang 146 has been swung downwardly far enough to cause the pawl tooth 129 to become disengaged from the tooth 128 on the shutter operating bar 110, the rearwardly moving link 151 pivots lever 157 in a direction that causes its upper end to swing plate 72 and mirror 76 into their upright or operative positions, wherein the reflective face of mirror 76 causes light from the objective lens 34 to be reflected downwardly onto mirror 83 which in turn reflects this light laterally through the opening 85 in the frame section 22 and onto the forward portion of the shutter plate 100, which at the moment is blocking the film aperture in camera C.

As soon as the mirror 76 has reached its upright position, the tang 146 on trigger 136 finally engages the forward end of the pawl 130 causing it to be pivoted downwardly far enough to disengage tooth 129 from tooth 128. The bar 110 is thus released, and is urged rapidly forwardly to its advanced position, where it is stopped by engagement of its lateral dog 126 with a shoulder 166 (FIGS. 3 and 7) formed on the upper edge of plate 114 intermediate its ends. At this time the outer end of dog 126 is positioned directly behind the rear end of the cocking bar 52.

During the advance of the operating bar 110, the shutter plate 100 is shifted rapidly forwardly inside of the housing 86 so that its slot 101 rapidly traverses the frame of film then disposed in registry with mirror 83. During this advance of slot 101 the mirror 76 is still in its elevated position, so that the image developed by the objective lens 34 is reflected downwardly from the mirror 76, laterally from the mirror 83, and progressively through the traversing slot 101 onto the registering film frame. When the shutter plate 100 reaches its advanced position, its slot 101 is disposed adjacent to the opposite or forward side of the camera supporting section 88, so that light is no longer admitted through the film aperture and onto the film.

As soon as the slot 101 reaches its advanced position, and assuming that the operator has commenced to release the trigger 136, the spring 152 returns the link 151 forwardly, and the mirror 76 returns downwardly to its inoperative position. Also at this time the cam 138 has been returned by its spring 141 in a counter clockwise direction so that its tongue 143 is again seated on the upper end of the pin 144. With the shutter plate 100 and the operating bar 110 and its dog 126 once again in their forward or released positions, subsequent actuation or pulling of the trigger 136 and consequent elevating of the mirror 76 will not result in the double exposure of the film frame then in registry with the mirror 83, because the shutter slot 101 will at this time also be in its advanced position adjacent the left side of section 88 of housing 86, and the trailing end of the shutter plate 100 will thus be in a capping or blocking position in which it will prevent the admission of light through the film aperture onto the film in holder C.

Before another picture can be taken, the shutter plate 100 and its operating bar 110 must be recocked to return the shutter slot 101 to its rear or cocked position. This is done by grasping the cocking ring 50 and manually drawing it rearwardly until it engages the mounting plate 40. This movement shifts the cocking rod 52 rearwardly against the dog 126 on bar 110, so that the latter is urged rearwardly until its tooth 128 once again becomes releasably engaged behind the latching tooth 129 on the pawl 130. During this rearward movement of the rod 52, the tongue 143 on cam 138 is positioned beneath rod 52, which therefore prevents accidental squeezing of the trigger and undesirable movement of mirror 76 to its upper position. Also, a film advancing mechanism (not illustrated), which is coupled by the cocking rod 52 to a film advancing arm on the camera C (not illustrated) indexes or advances the film one frame to bring a new, unexposed frame into registry with the mirror 83. In lieu of an automatic film advancing mechanism, of course, the film may be advanced manually after each picture is taken. In any event, the advancing of the film should take place prior to the release of the cocked operating bar 110.

After bar 110 has been shifted rearwardly to its cocked position, the cocking ring 50 is released and returned automatically by spring 56 to its advanced position, so that the rear end of rod 52 is disposed forwardly of the tongue 143 on the cam 138, so as not to interfere with subsequent squeezing of the trigger 136. With the film advanced, and the operating bar 110 once again in its cocked position, the operator may adjust sleeve 36 to focus the object to be photographed, and then squeeze the trigger 136 to photograph another picture in a manner which will be apparent from the above description.

Figure 8:
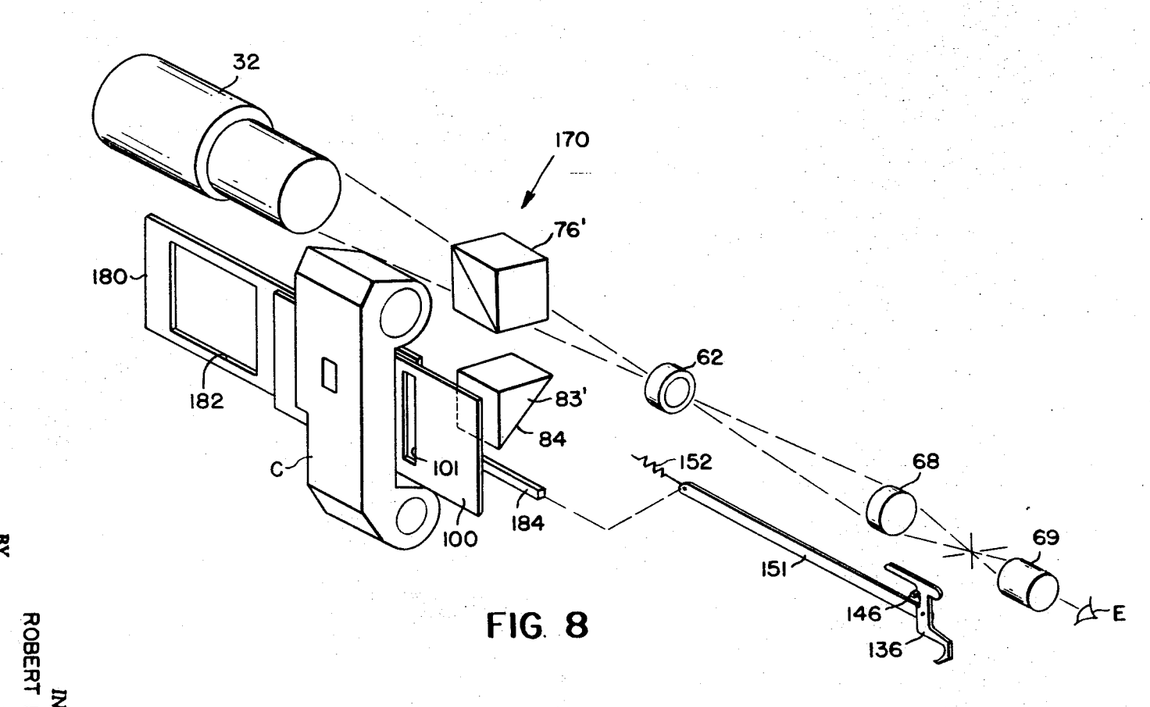
FIG. 8 is an exploded perspective view of a modified form of this photogun made in accordance with another embodiment of this invention.

Referring now to FIG. 8, wherein like numerals are employed to denote elements similar to those employed in the embodiment illustrated in FIGS. 1 to 7, 170 denotes a modified photogun comprising an axially adjustable objective lens housing 32 mounted in a frame (not illustrated) similar to that employed in the first embodiment. Housing 32 contains the usual objective lens (not illustrated), which, as in the first embodiment, is mounted axially of a mask 62 containing a field lens, a relay lens 68, and a housing 69 containing the eye piece lenses. In this embodiment, however, instead of using a pivotal mirror 76, a conventional beam splitter 76' is secured in the frame section 22 between the objective and field lenses, and in vertical registry with a prism 83' having an underside or surface 84, which is coated with a reflective material, and which is disposed in a plane that extends, as in the case of the mirror 83, at an angle of approximately 45° to the vertical. Part of the light entering photogun 170 through the objective lens in housing 32 is thus transmitted rearwardly through the beam splitter 76', the field lens, the relay lens 68 and the eye piece lenses to the eye E of the observer or operator. The remaining portion of this light is transmitted vertically downwardly onto the reflective surface 84 of the prism 83', from which it is projected laterally toward the film in a holder C, which, as in the case of the first embodiment, is mounted on the side of the photogun frame. Photogun 170 also contains the focal plane shutter plate 100, which is attached to an operating rod (not illustrated) of the type employed in the first embodiment, so that upon reciprocation of the operating rod the slot 101 in the shutter plate 100 will traverse the face of the film frame then disposed in operative position in camera C.

In the case of photogun 20, during the retraction or cocking of its shutter plate 100 the trigger 136 is not being squeezed, so that the mirror mounting plate 72 is in its lowered or inoperative position, in which it prevents light from passing downwardly onto the mirror 83 and laterally toward the film during the return movement of the shutter plate slot 101. In the case of photogun 170, however, the beam splitter 76' is always fixed between the objective and field lenses, and cannot prevent light from being transmitted to the prism 83', and then toward the film, during the retraction of the associated shutter plate 100.

To prevent undesirable exposure of the film during the retraction of the shutter 100 in the photogun 170, an elongate, rectangular capping plate 180 is mounted in the frame to slide relative to the plate 100, and in closely spaced, parallel relation to the inside face thereof. In its forward end capping plate 180 has a large rectangular opening 182, which is movable between an advanced position (FIG. 8) in which the opening is positioned forwardly of the film in holder C, and a retracted position in which opening 182 registers with the prism 83' and the frame of film then disposed in operative position in the cartridge C. When the capping plate 180 is disposed in its forward or advance position (FIG. 8), the solid, rear end of plate 180 is disposed in a capping position between the prism 83' and the film in holder C, thereby to prevent any light from being transmitted from the prism 83' onto the film.

Plate 180 is operatively connected to the trigger 136 of photogun 170 so that when the trigger is pulled or squeezed to take a picture, the capping plate 180 is drawn rearwardly from its advanced or light blocking position (FIG. 8) to its operative position in which its opening 182 registers with the film and prism 83'. This rearward movement of the plate 180 occurs, as in the case of the pivotal movement of plate 72 in the first embodiment, during the initial pulling of the trigger 136, and before the trigger releases the cocked shutter plate 100. For this purpose plate 180 is fastened adjacent its rear end, for example, to a rearwardly projecting bar 184, which is coupled in a manner that will be apparent to one skilled in the art, to a link 151 similar to that employed in the first embodiment, so that when the link is retracted during the initial squeezing of the trigger, the capping plate 180 will also be shifted rearwardly to its operative position. It will be apparent, of course, that in the case of photogun 170, the lever 157, which was used in the first embodiment for tilting the mirror 76, is eliminated.

As soon as the capping plate 180 reaches its retracted position, shutter plate 100 is released so that its slot 101 advances forwardly between the film in holder C and the opening 182 then registering with the prism 83', so that the light transmitted downwardly by the beam splitter 76' is projected by the prism 83' onto the film in known manner. As soon as the picture is taken, the trigger 136 is released and link 151 advances to return the capping plate 180 to its forward or light blocking position, so that upon subsequent cocking of photogun 170, and the consequent retraction of the slot 101 in the shutter 100, the rear end of the capping plate 180 will prevent exposure of the film to the light then being transmitted by the beam splitter 76' onto the prism 83'. The photogun 170 otherwise operates in a manner similar to that of the photogun 20 described in the first embodiment.

From the foregoing it will be apparent that the instant invention provides novel photoguns, which are rugged, compact, and extremely accurate. A major advantage of the photoguns disclosed herein is that each has an in-line viewing system in which the objective, field, relay and eye piece lenses are all disposed axially of one another in the telescopic sighting mechanism. This enables the operator to view through the mask 62 the exact image that will be photographed, and also eliminates undesirable parallax present in certain prior devices of the type which employ in the viewing device, mirrors for transmitting the image laterally from the objective lens to an offset eye piece lens. Moreover, by mounting the film in laterally offset relation to the objective lens, and by using a pair of mirror elements for transmitting the image laterally to the film, there is full image restitution at the plane of the film, so that the image is photographed upright on the film, or in the same vertical position as viewed through the viewing mechanism.

Other advantages include the use of a focal plane shutter, the speed of which can be adjusted, for example, by using any conventional means for varying the pre-tension in the torsion spring 119, which is used to advance the operating bar 110. Moreover, by using the cam 138 for an interlock, the trigger 136 is prevented from being operated except when the cocking rod 52 is in its advanced position, at which time the shutter slot 101 will be in one or the other of its limit positions to prevent undesirable exposure of the film in holder C. Moreover, the trigger must be allowed to return to its forward or release position before the shutter plate can again be cocked and the film advanced. This is necessary because, in the case of the photogun 20, the mirror mounting plate 72 functions as a cap to block out light, which would otherwise be transmitted to the film through the shutter slot 101 during the retraction of the shutter plate 100.

In assembling either of the photoguns 20 or 170, it is essential that the linear distance that an image is transmitted from the objective lens 34 to the film plane, be equal to the linear distance from the objective lens to the field lens 64. For this purpose the entire erector tube assembly, as represented by the lens housings 60 and 69, can be moved as a unit, during assembly, to position the field lens 64 the correct axial distance from the objective lens 34. This achieves parfocalization of the photographic and the visual image planes. The operator is then assured that an image in focus, as viewed by the operator's eye, will also be in focus at the film plane. While it has been suggested that the flat side of field lens 64 be provided with a fine grind in a circular configuration to provide a surface for displaying the image transmitted by the objective lens 34, it will be understood, of course, that any conventional technique may be employed for this purpose.

By placing the focusing barrel 36 coaxially of the shutter cocking ring 50, and forwardly thereof, the operation of the photogun is simplified, in that after rotating the sleeve 36 to focus the objective lens 34, the operator need only to slide his or her hand slightly rearwardly to grasp and then pull the ring rearwardly to cock the gun. This enables the photogun to be operated rapidly, it enhances its use not only for photographing wild life, but also for use in surveillance photography, including military, police, newspaper work, and for industrial photographs in hazardous areas.

Having thus described my invention, what I claim is:

1. A photogun device for taking photographs at long range, comprising a frame having a gun stock projecting from the rear end thereof, an objective lens mounted adjacent the forward end of said frame for projecting an image rearwardly through said frame along a first axis, first reflecting means in said frame rearwardly of said lens for projecting said image along a second axis which intersects said first axis at a right angle, second reflecting means in said frame in spaced, registering relation to said first means, and operative to project said image along a third axis which intersects said second axis at a right angle, means for mounting an image recording strip of light sensitive material on said frame in spaced, registering relation with said second means, and in a plane normal to said third axis, a movable shutter interposed between said second means and said strip, and movable transverse to said third axis from a cocked to a released position momentarily to expose said strip to said second means to effect recording of said image on said strip, shutter operating means including a movable trigger on said frame for releasably latching said shutter in its cocked position, and operative in response to the operation of said trigger to move said shutter to its released position, and means on said frame movable independently of said shutter to prevent exposure of said strip during movement of said shutter from its released to its cocked position.

2. A photogun as defined in claim 1, wherein said first reflecting means comprises, a first mirror mounted in said frame to pivot between operative and inoperative positions about a fourth axis parallel to said third axis, and means connecting said mirror to said trigger and operative normally to urge said mirror into an inoperative position in which it extends normal to said second axis to interrupt the passage of light from said objective lens to said second reflecting means, and responsive to the operation of said trigger to move said mirror to an operative position in which the reflective surface of the mirror is disposed in registry with said objective lens and second reflecting means, and lies in a plane inclined to, and extending through the intersection of, said first and second axes, thereby to direct said image along said second axis to said second reflecting means.

3. A photogun as defined in claim 2, wherein said connecting means provides pre-travel of said trigger to swing said first mirror from its inoperative to its operative position, and operative only after said mirror has reached its operative position, to effect the release of said shutter.

4. A photogun as defined in claim 1, wherein said first reflecting means comprises a beam splitter fixed in said frame at the intersection of said first and second axes and operative to transmit part of the light from said objective lens rearwardly toward said rear end of said frame, and operative to transmit the remaining portion of said light onto said second reflecting means.

5. A photogun comprising a frame having a gun stock projecting from the rear end thereof, an objective lens adjustably mounted adjacent the forward end of said frame for projecting an image rearwardly through said frame along a first axis, first reflecting means in said frame rearwardly of said lens for projecting said image along a second axis which intersects said first axis at a right angle, second reflecting means in said frame in spaced, registering relation to said first means, and operative to project said image along a third axis which intersects said second axis at a right angle, means for mounting an image recording strip of light sensitive material on said frame in spaced, registering relation with said second means, and in a plane normal to said third axis, a movable shutter interposed between said second means and said strip, and movable transverse to said third axis from a cocked to a released position momentarily to expose said strip to said second means to effect recording of said image on said strip, shutter operating means including a movable trigger on said frame for releasably latching said shutter in its cocked position, and operative in response to the operation of said trigger to move said shutter to its released position, said first reflecting means comprising a beam splitter fixed in said frame at the intersection of said first and second axes and operative to transmit part of the light from said objective lens rearwardly toward said rear end of said frame, and operative to transmit the remaining portion of said light onto said second reflecting means, and a capping plate mounted adjacent said shutter and connected to said trigger for movement thereby transverse to said third axis, upon operation of said trigger, from a capping position in which one end of said plate is interposed between said second reflecting means and said strip to block the transmission of light from the former to the latter, to an exposure position in which an opening in the opposite end of said plate registers with said strip to permit exposure thereof to said image upon the release of said shutter by said trigger.

6. A photogun, comprising a frame having a gun stock projecting from the rear end thereof, an objective lens adjustably mounted adjacent the forward end of said frame for projecting an image rearwardly through said frame along a first axis, first reflecting means in said frame rearwardly of said lens for projecting said image along a second axis which intersects said first axis at a right angle, second reflecting means in said frame in spaced, registering relation to said first means, and operative to project said image along a third axis which intersects said second axis at a right angle, means for mounting an image recording strip of light sensitive material on said frame in spaced, registering relation with said second means, and in a plane normal to said third axis, a movable shutter interposed between said second means and said strip, and movable transverse to said third axis from a cocked to a released position momentarily to expose said strip to said second means to effect recording of said image on said strip, shutter operating means including a movable trigger on said frame for releasably latching said shutter in its cocked position, and operative in response to the operation of said trigger to move said shutter to its released position, resilient means urging said shutter toward its released position, a manually operable cocking rod reciprocable on said frame parallel to said first axis, and operatively connected to said shutter to shift said shutter to its cocked position upon movement of said rod in one direction, a first tooth fixed to said shutter for movement therewith, and a latch movably mounted on said frame and having thereon a second tooth releasably engageable with said first tooth, upon movement of said shutter to its cocked position, releaseably to hold said shutter in its cocked position against the resistance of said resilient means, means pivotally mounting said trigger on said frame adjacent said latch for movement between firing and rest positions, respectively, and a projection on said trigger spaced from said latch, when said trigger is in its rest position, and operative to engage and move said latch in a direction to disengage said second tooth from said first tooth to release said shutter, when said trigger is moved to its firing position.

7. A photogun as defined in claim 6, wherein said shutter comprises a plate mounted in said frame to reciprocate in a plane transverse to said third axis, and operative in each of its two limit positions to cover said strip to prevent exposure of said strip, and said plate has therethrough an elongate slot extending normal to the path of reciprocation of said plate, and movable transversely of said strip progressively to expose successive portions of the face of said strip to the image transmitted by said second means, when said plate travels from its cocked to its released position.

8. A photogun as defined in claim 6, including means interposed between said trigger and said cocking rod and operative to prevent movement of said trigger, when said rod has been moved toward its limit position in said one direction, and to prevent movement of said cocking rod in said one direction when said trigger has been moved toward its firing position.

9. A photogun as defined in claim 6, wherein said first reflecting means comprises a mirror mounted in said frame to pivot into and out of registry with said objective lens, and operative, when in registry with said objective lens, to project the image therefrom onto said second reflecting means, and means connects said mirror to said trigger and is operative during the initial movement of said trigger toward its firing position, to swing said mirror into registry with said objective lens before said second tooth is disengaged from said first tooth by said projection.

10. A photogun as defined in claim 6, wherein said first reflecting means comprises a beam splitter fixed in said frame adjacent said second reflecting means to pass said image rearwardly along said first axis toward said rear end of the frame, and also to transmit said image onto said second reflecting means, and a capping plate is mounted adjacent said shutter for movement by said trigger to an inoperative position in which it covers said strip, when said trigger is in its rest position, and to an operative position in which it uncovers said strip to allow exposure of the latter to the image transmitted by said second reflecting means, when said trigger is moved toward its firing position, and prior to the release of said shutter.

11. A photogun as defined in claim 1, including a field lens mounted in said frame rearwardly of said first reflecting means axially of said objective lens, and having on the rear face thereof a ground surface for focusing thereon said image, and an eyepiece mounted on said frame adjacent the rear end thereof, and containing a further plurality of lenses registering axially with said objective and field lenses, and operative to transmit in an upright position to the eye of an observer, the image projected by said objective lens onto the rear face of said field lens.

12. A photogun as defined in claim 11, wherein said field lens is spaced rearwardly of said second axis a linear distance equal to the combined linear distances between said first and third axes, and said second axis and said plane, respectively.

13. A photogun, comprising a frame having a gun stock projecting from the rear end thereof, telescopic objective and viewing means mounted on said frame, and including an objective lens for projecting an image rearwardly through said means along a first axis, and a field lens spaced rearwardly of said objective lens and aligned therewith, a housing mounted on said frame for supporting a strip of film in registry with a lateral opening formed in said frame between said lenses, a shutter mounted on said housing between said film and said opening for movement between cocked and released positions, respectively, resilient means urging said shutter toward its released position, a manually operable cocking rod reciprocably mounted on said frame and operatively connected to said shutter to move the latter to its cocked position upon movement of said rod in one direction, means for releasably latching said shutter in its cocked position, a trigger movably mounted on said frame and operable to cause said latching means to release said shutter for movement by said resilient means from its cocked to its fired position, and means mounted in said frame between said lenses and operative during movement of said shutter to its released position to project said image laterally through said opening and onto said film to be photographed thereby.

14. A photogun as defined in claim 13, including means mounting said objective lens for adjustment in said frame axially on said first axis, and a manually rotatably adjusting sleeve mounted on said frame beneath said objective lens for rotation about an axis parallel to said first axis, and operatively connected to said objective lens to effect axial adjustment of said objective lens upon rotation of said sleeve.

15. A photogun as defined in claim 14, including means mounting said rod for reciprocation parallel to the axis of rotation of said sleeve, and a ring mounted rearwardly of said sleeve for manual reciprocation coaxially of said sleeve and connected to said rod to impart reciprocation thereto upon reciprocation of said ring.

16. A photogun as defined in claim 13, wherein said shutter comprises a plate mounted to reciprocate between cocked and released positions parallel to said film strip and said first axis, and having therethrough an elongate slot extending transverse to said first axis, and movable transversely across the face of said film strip to expose the latter to said opening in said frame during movement of said plate from its cocked to its released position, an operating bar is secured at one end to said plate and projects adjacent its opposite end behind said cocking rod to be engaged and moved thereby in a direction to cock said shutter upon movement of said rod in said one direction, and a projection on said bar adjacent said opposite end thereof is releasably engageable by said latching means to hold said plate releasably in its cocked position.

17. A photogun as defined in claim 16, wherein said image projecting means comprises a fixed mirror in said frame beneath said objective and viewing means and inclined to said shutter plate thereby to register both with said lateral opening in said frame, and with a further opening formed in the underside of said objective and viewing means between said lenses, a movable mirror mounted in said frame above said fixed mirror to pivot about an axis transverse to said first axis between an inactive position in which said movable mirror is positioned over said further opening beneath and parallel to said first axis to prevent light from said objective lens from being projected onto said fixed mirror, and an active position in which said movable mirror is inclined transversely of said first axis to register both with said objective lens, and with said fixed mirror through said further opening, and means connecting said movable mirror to said trigger for movement thereby from its inactive to its active position upon operation of said trigger.

18. A photogun as defined in claim 17, wherein said connecting means includes means operative upon operation of said trigger to elevate said movable mirror to its active position before release of said shutter plate, and operative to return said movable mirror to its inactive position upon release of said trigger.

* * * * *